United States Patent
Kouketsu (10) Patent No.: US 6,508,268 B1
(45) Date of Patent: *Jan. 21, 2003

(54) VACUUM PRESSURE CONTROL APPARATUS

(75) Inventor: Masayuki Kouketsu, Tokyo (JP)

(73) Assignee: CKD Corporation, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/438,956

(22) Filed: Nov. 12, 1999

(30) Foreign Application Priority Data

Nov. 13, 1998 (JP) .......................... 10-323690

(51) Int. Cl.[7] .......................... F16K 31/42; F16K 51/02
(52) U.S. Cl. ................. 137/488; 137/487.5; 251/335.2; 251/900
(58) Field of Search ................ 137/12, 487.5, 137/565.23, 488; 251/122, 335.3, 900

(56) References Cited

U.S. PATENT DOCUMENTS 5,363,872 A * 11/1994 Lorimer .................. 251/335.3
5,383,648 A * 1/1995 Pipinias .................... 251/900
6,032,419 A * 3/2000 Hurwitt ........................ 137/1
6,041,814 A * 3/2000 Kouketsu et al. ........... 137/488

* cited by examiner

Primary Examiner—Michael Powell Buiz
Assistant Examiner—Ramesh Krishnamurthy
(74) Attorney, Agent, or Firm—Finnegan, Henderson, Farabow, Garrett & Dunner L.L.P.

(57) ABSTRACT

A vacuum pressure control apparatus includes a vacuum proportional opening and closing valve 18 which is disposed on a pipe connecting a vacuum chamber 11 and a vacuum pump 19 and changes its opening to control the vacuum pressure in the vacuum chamber 11, and a pressure sensor 17 which measures the current vacuum pressure in the chamber 11. The vacuum proportional opening and closing valve 18 has a valve seat 36 and a valve member 33 provided with an O-ring 35 which is made contact with or separate from the valve seat 36. The vacuum pressure control apparatus configured as above controls the pressure in the chamber 11 by changing an elastic deformation amount of the O-ring 35 which is in contact with the valve seat 36 and thereby changing the flow quantity of gas leaking between the valve seat 36 and the O-ring 35.

7 Claims, 8 Drawing Sheets

VACUUM PRESSURE CONTROL APPARATUS

BACKGROUND OF THE INVENTION

1. Field of the Invention

The present invention relates to a vacuum pressure control apparatus for controlling vacuum pressure in a vacuum vessel to a predetermined value, the vacuum vessel being used in semiconductor producing processes, and particularly to a vacuum pressure control apparatus for accurately and promptly controlling vacuum pressure in a vacuum vessel to a predetermined value in a low vacuum region near atmospheric pressure.

2. Description of Related Art

Figure 8:
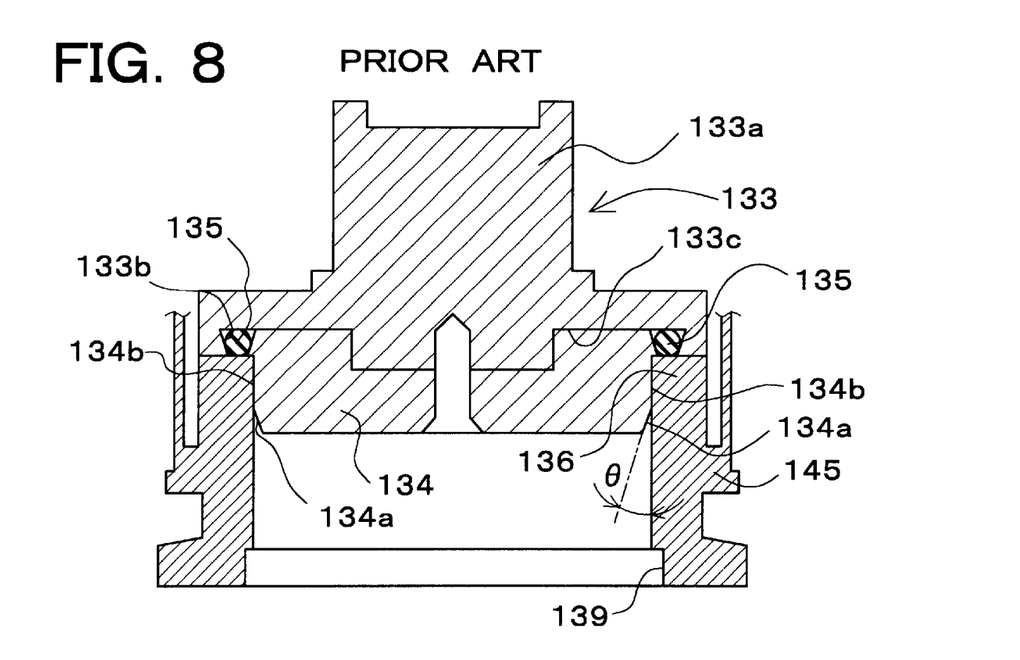
FIG. 8 is a cross sectional view of a part of a vacuum proportional opening and closing valve in a prior art, including a valve seat and others surrounding the valve seat in a valve closed state.

One of vacuum pressure control systems which have conventionally been used in semiconductor producing processes is described in U.S. Patent application No. 08/580,358 filed by applicant of the present invention. This vacuum pressure control system uses a vacuum proportional opening and closing valve which is disposed between a vacuum chamber and a vacuum pump and regulates the quantity of gas flow to be sucked by the vacuum pump to regulate the internal pressure value of the vacuum chamber into a predetermined vacuum pressure. The vacuum proportional opening and closing valve is provided with a poppet valve as a main element. Referring to FIG. 8, the structure of this poppet valve is described.

Figure 9:
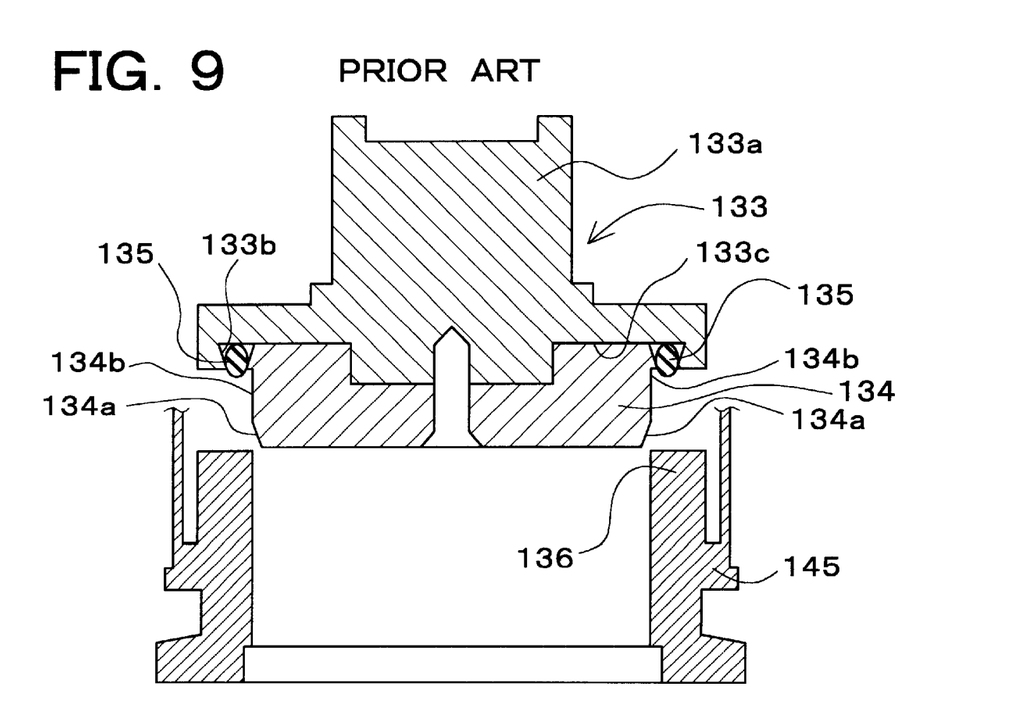
FIG. 9 is a cross sectional view of the vacuum proportional opening and closing valve shown in FIG. 8 in a valve open state.

FIG. 8 shows a part of the vacuum proportional opening and closing valve in a closed state. FIG. 9 shows the same in an open state to provide a medium vacuum region in the vacuum chamber.

A poppet valve 133 has a valve member 133a connected to a piston rod not shown, an annular groove 133b which fixedly holds an O-ring 135, and a connection portion 133c to which a valve element 134 made from stainless steel is assembled. The O-ring 135 will be depressed against the upper surface of a valve seat 136 constructed of a cylindrical inner surface formed in a lower center of a valve body 145 of the vacuum proportional opening and closing valve when a tapered surface 134a formed on the outer periphery of the stainless valve element 134 of the poppet valve 133 is fully inserted in the valve seat 136. Accordingly, the O-ring 135 serves to prevent leakage of fluid through a flow passage defined by the valve seat 136 of the valve body 145 having a port 139 formed below the valve seat 136 and connected to the vacuum chamber. The inclination angle θ of the tapered surface 134a of the stainless valve element 134 is set to 3 degrees in the U.S. Patent application No. 08/580,358. The stainless valve element 134 has also a straight surface 134b above the tapered surface 134a.

As shown in FIG. 9, when the stainless valve element 134 with the tapered surface 134a is moved along the center line (in a vertical direction in figure) of the valve seat 136, an annular clearance between the tapered surface 134a and the valve seat 136 changes in sectional area. In response to the clearance area, the opening degree of the vacuum proportional opening and closing valve is changed. As shown in FIG. 8, when the poppet valve 133 comes into contact with the upper surface of the valve seat 136, pressing the O-ring 135 against the upper surface of the valve seat 136, the O-ring 135 completely blocks the flow passage to prevent a leakage flow of fluid.

However, the above conventional vacuum pressure control system and control apparatus have the following problems.

Specifically, the clearance area between the tapered surface 134a and the valve seat 136 is changed to regulate the quantity of fluid flow sucked by the vacuum pump. This can relatively facilitate the provision of the flow quantity corresponding to high vacuum pressure near high vacuum or medium vacuum pressure.

The clearance area between the tapered surface 134a and the valve seat 136 is relatively large, however, and it is difficult to regulate the quantity of fluid flow so as to maintain the pressure in the vacuum chamber in a low vacuum region near atmospheric pressure, in particular, extremely close to atmospheric pressure. Such the regulation of the flow quantity to very-low-vacuum pressure is much more difficult when the O-ring made of rubber is used because it is prone to come into intimate contact with the flat upper surface of the valve seat 136. When process gas precipitates on the inside of the valve body 145 and others, the contact degree of the O-ring 135 to the valve seat 136 increases, and the poppet valve 133 will quickly change its moving distance due to the change in the friction coefficient which shifts to dynamical friction from static friction in association with the movement of the poppet valve 133, causing the O-ring 135 to instantaneously separate from the flat upper surface of the valve seat 136. This disables the control to accurately provide a very small clearance between the tapered surface 134a and the valve seat 136.

SUMMARY OF THE INVENTION

The present invention has been made in view of the above circumstances and has an object to overcome the above problems and to provide a vacuum pressure control apparatus capable of accurately controlling the internal pressure in a vacuum vessel in a low vacuum region near atmospheric pressure.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a vacuum pressure control apparatus for controlling vacuum pressure in a vacuum vessel from which gas is sucked by means of a vacuum pump, the apparatus including a vacuum proportional opening and closing valve which is disposed between the vacuum pump and the vacuum vessel and changes its opening for controlling the vacuum pressure in the vacuum vessel, the vacuum proportional opening and closing valve including a valve seat having a central flow passage through which the gas is sucked from the vacuum vessel to the vacuum pump, and a valve member that is movable to come into contact with the valve seat and to separate from the same, the valve member being provided with an elastic sealing member on a surface that comes into contact with the valve seat, and the vacuum pressure control apparatus controlling a change in an elastic deformation amount of the elastic sealing member which is in contact with the valve seat to regulate the quantity of gas leakage between the elastic sealing member and the valve seat and to provide a predetermined vacuum pressure in the vacuum vessel.

In the vacuum pressure control apparatus, preferably, a force applied to the elastic sealing member which is in contact with the valve seat through the valve member is controlled to change the elastic deformation amount of the elastic sealing member.

For instance, the vacuum proportional opening and closing valve may include a pilot cylinder for moving the valve member, and the vacuum pressure control apparatus controls a change in air pressure to be supplied to the pilot cylinder to thereby control the force applied to the elastic sealing member which is in contact with the valve seat through the valve member and change the elastic deformation amount of the elastic sealing member.

Next, operation of the vacuum pressure control apparatus configured in the above manner is described below.

The vacuum pump connected to the vacuum vessel makes a constant suction of gas from the vacuum vessel. By changing the opening degree of the vacuum proportional opening and closing valve disposed between the vacuum vessel and the vacuum pump, the quantity of gas flow sucked into the vacuum pump from the vacuum vessel is regulated, thus changing vacuum pressure in the vacuum vessel.

In order to regulate the pressure in the vacuum vessel to high or medium vacuum pressure, the opening degree of the vacuum proportional and opening valve is adjusted in the manner that the valve element is moved by the pilot cylinder along the center line of a flow passage formed in a center of the valve seat, changing a clearance area between the valve seat and the valve element.

In order to regulate the pressure in the vacuum vessel to low vacuum pressure near atmospheric pressure, the vacuum pressure control apparatus operates to change an elastic deforming amount of the elastic sealing member which is in contact with the valve seat and thereby change the quantity of gas leakage through the elastic sealing member.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of one preferred embodiment of a vacuum pressure control apparatus according to the present invention embodying the present invention will now be given referring to the accompanying drawings.

Figure 5:
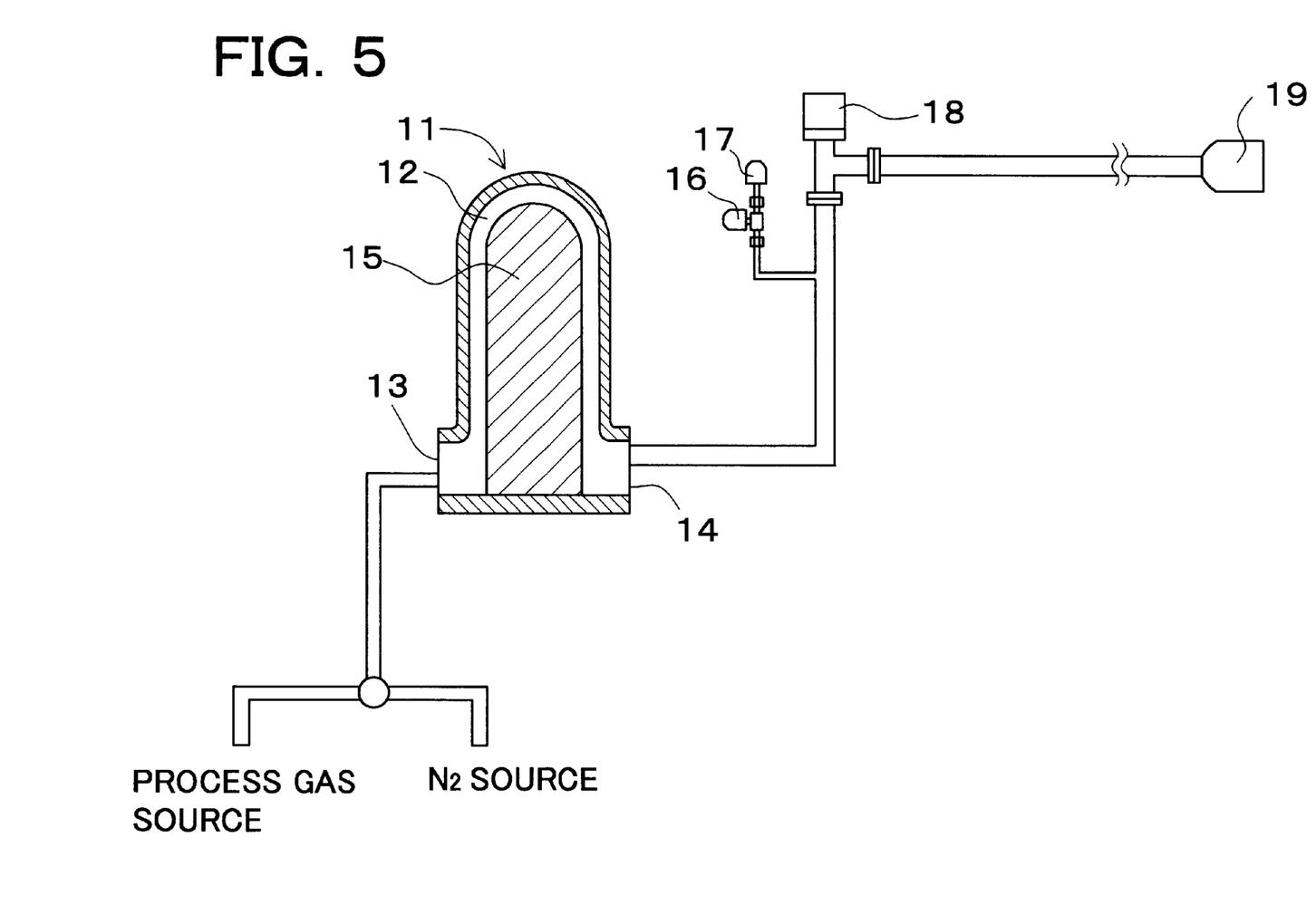
FIG. 5 is a block diagram of the whole structure of a vacuum pressure control system in which the vacuum pressure control apparatus in the embodiment is used.

First, one example of a vacuum pressure control system in which the vacuum pressure control apparatus is used is explained with reference to FIG. 5.

In the system, a vacuum chamber 11 serving as a vacuum vessel has an inner space 12 in which wafers 15 to be processed are placed in tires, an inlet 13, and an outlet 14. The inlet 13 is connected to a source of process gas and a source of nitrogen gas which is used for purging the inside of the vacuum chamber 11. The outlet 14 is connected, through pipes and the like, to an inlet port 39 (see FIG. 1) of a vacuum proportional opening and closing valve 18 (hereinafter referred to as a vacuum proportional O/C valve) which is an opening-degree proportional valve. An outlet port 40 (see FIG. 1) of the vacuum proportional O/C valve 18 is connected to a vacuum pump 19.

The outlet 14 of the chamber 11 is also connected to a pressure sensor 17 through a shutoff valve 16. In the present embodiment, a capacitance manometer is used for the pressure sensor 17.

Figure 1:
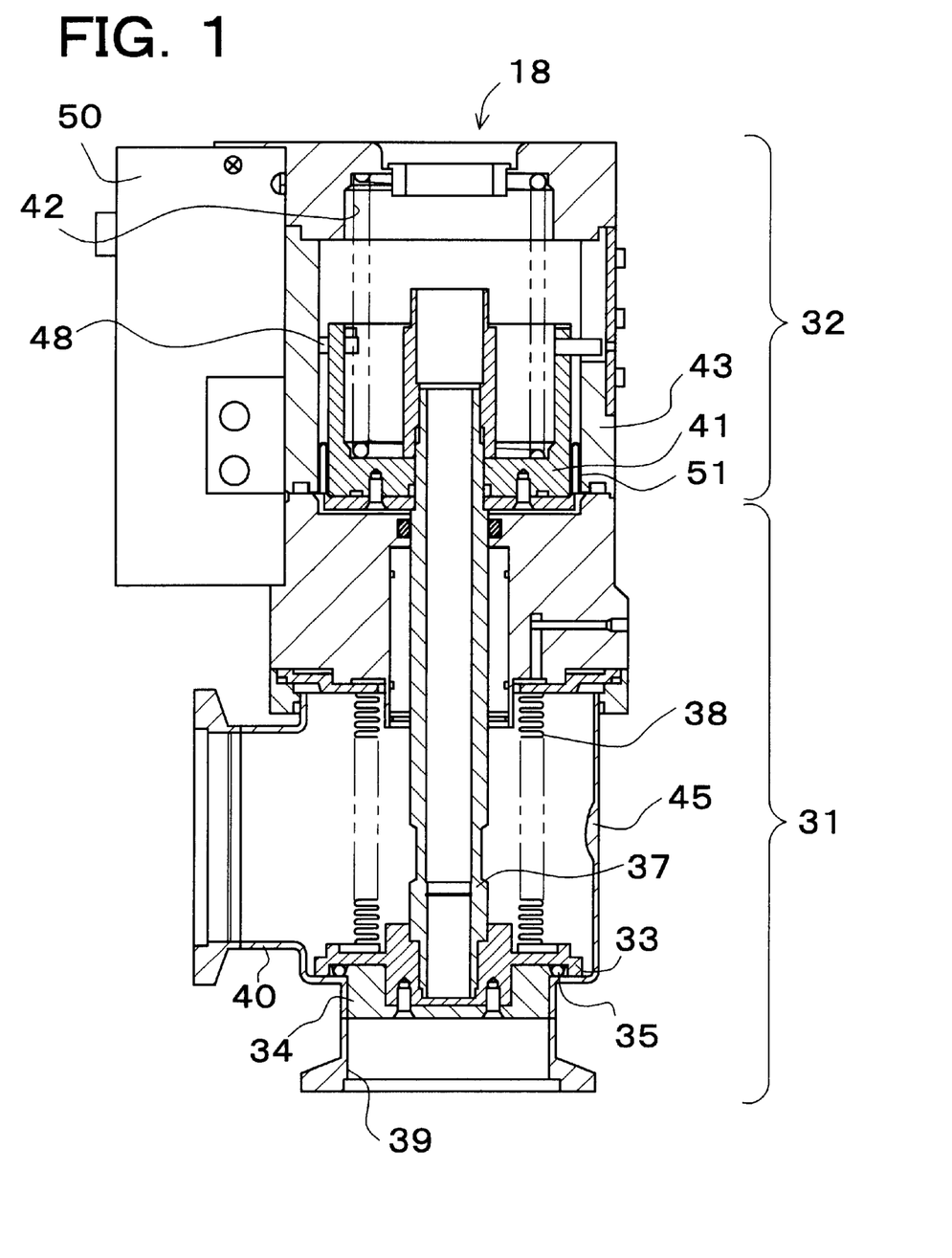
FIG. 1 is a cross sectional view of a vacuum proportional opening and closing valve used in a vacuum pressure control apparatus in a preferred embodiment according to the present invention.
Figure 2:
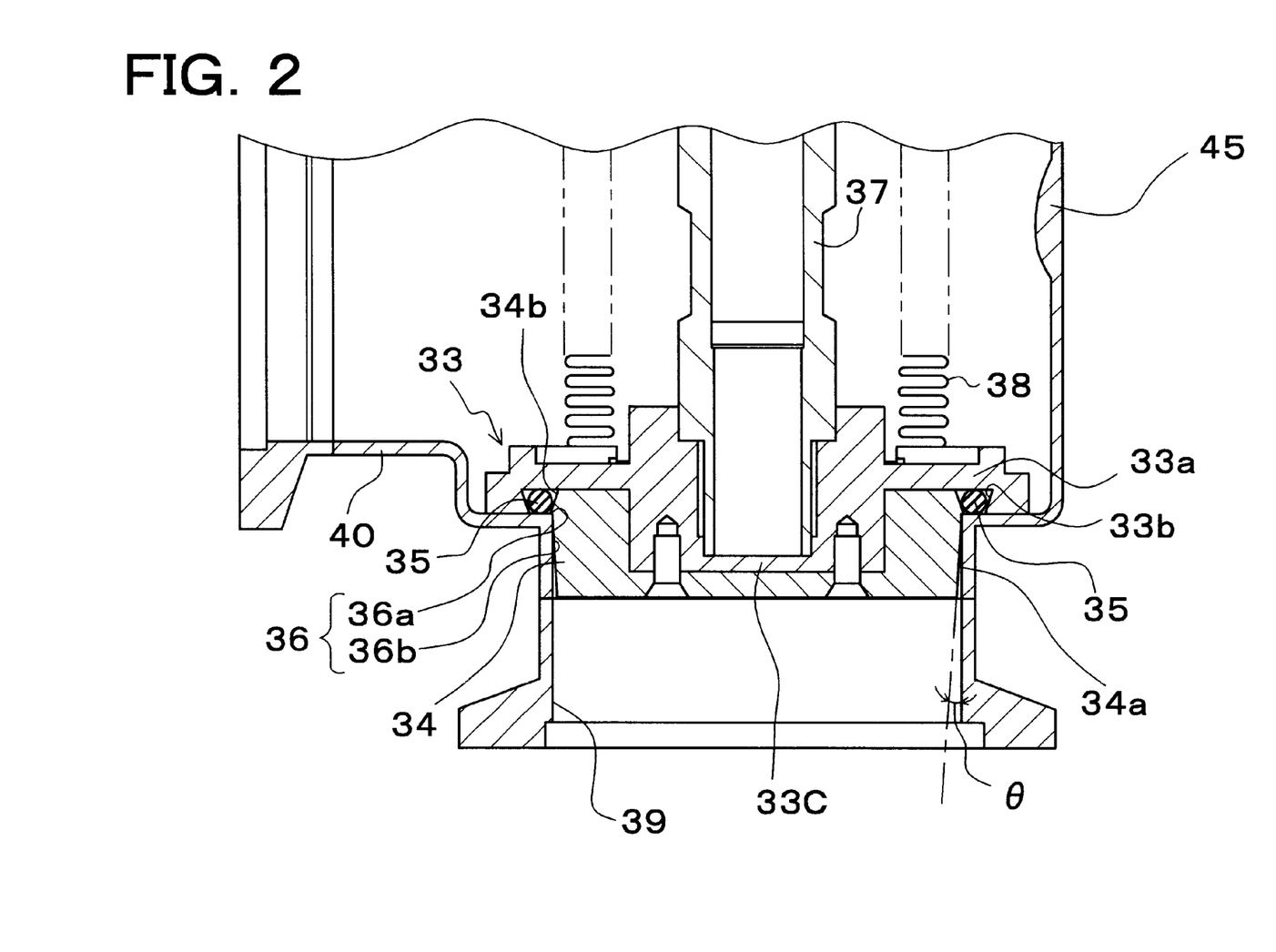
FIG. 2 is a cross sectional view of a part of the vacuum proportional opening and closing valve shown in FIG. 1, mainly showing a valve seat and peripheral elements thereof.

Next, the structure of the vacuum proportional O/C valve 18 is described with reference to FIGS. 1 and 2. FIG. 1 shows a closed state of the vacuum proportional O/C valve 18. FIG. 2 shows a lower part of the valve 18 in a closed state.

The vacuum proportional O/C valve 18 is mainly constructed of a pilot cylinder 32 configuring an upper part of the valve 18 and a bellows-type poppet valve 31 configuring a lower part of the same. In the present embodiment, the pilot cylinder 32 is a normal type cylinder in general use.

This pilot cylinder 32 is constructed as below. In the pilot cylinder 32, a piston 41 is slidably inserted in a single acting pneumatic cylinder 43. The piston 41 is always biased downward by the force of a return spring 42.

The piston 41 is connected at its upper end with a slide lever 48 which extends outside the single acting pneumatic cylinder 43. The lever 48 is also coupled to a rod (not shown) of a potentiometer 50. This rod is connected to a variable resistance of the potentiometer 50 which accurately detects positions of the piston 41.

The piston 41 is circumferentially connected at its lower end with the inner periphery of a bellofram 51. The outer periphery of the bellofram 51 is fixed with h an inside wall of the cylinder 43. The bellofram 51 is designed to be extremely thin and formed of strong clothes made from polyester, tetron (polyethylene glycol telephthalate) and the like which are covered over with rubber. The bellofram 51 is a cylindrical diaphragm having a long stroke and a deep folding part, whose effective pressure area in operating is kept constant and unchanged.

In the present embodiment, the bellofram 51 is used to separate both sides of the piston 41 in its axial direction to seal the cylinder 43 hermetically. Accordingly, the piston 41 can be moved with high responsibility and positional precision without the generation of stick slip.

A piston rod 37 is secured in the center of the piston 41 and is vertically slidable in accordance with the movement of the piston 41. A lower end of the piston rod 37 is fixedly connected with the poppet valve 33. An upper surface of the poppet valve 33 is connected with a lower end of a tubular bellows 38 which circumscribes the rod 37.

A more detailed structure of the poppet valve 33 is described, referring to FIG. 2 which is a part of the vacuum proportional O/C valve 18 in a closed state.

The poppet valve 33 is constructed of a valve member 33a connected with the piston rod 37, a groove 33b which holds an O-ring 35, and a connecting portion 33c to which a stainless valve element 34 is joined. The valve member 33a is constructed of a cylindrical portion with a centrally formed concave in which an end of the piston rod 37 is fitted and a horizontal-extending portion formed do surrounding the cylindrical portion. The groove 33b is formed in the underside of the horizontal extending portion. The connecting portion 33c is formed in the bottom of the cylindrical portion of the valve member 33a. The poppet valve 33 is provided with the stainless valve element 34 fixed to the connecting portion 33c with screws and the like. This stainless valve element 34 has a peripheral surface 34a downwardly tapered (in figure), which is inserted into a central flow passage defined by a valve seat 36 which will be mentioned later. The valve element 34 has also an upwardly tapered (in figure) surface 34b which is formed above the tapered surface 34a, for fixing the O-ring 35 in cooperation with the groove 33b of the poppet valve 33. In the present embodiment, the stainless valve element 34 is formed of SUS316L which is a stainless material prescribed in the Japanese Industrial Standards. The inclination angle θ of the tapered surface 34a is set to 3 degrees.

In the present embodiment, although the valve element 34 has the tapered surface 34a on its substantially entire surface, it may be formed in a similar shape to the valve element of the poppet valve in the prior art (see FIG. 8), which partially has a straight surface above the tapered surface.

The O-ring 35 is an elastic sealing member which is an important feature of the present invention. This O-ring 35 serves to prevent the leakage of gas when the tapered surface 34 of the stainless valve element 34 is fully inserted in the valve seat 36 of the valve body 45 and then a part of the valve member 33a of the poppet valve 33 is made contact under pressure with the valve seat 36, thus completely blocking the central flow passage of the valve seat 36. As the O-ring 35, in the present embodiment, an O-ring having the size of JIS (the Japanese Industrial Standards) P80 is used.

The valve seat 36 is constructed of a cylindrical inner surface 36b of a hollow cylindrical portion formed in a lower center of the valve body 45 and a horizontal surface 36a formed in a lower stepped portion of the valve body 45 above the cylindrical surface 36b. It is to be noted that the cylindrical surface 36a is configured as to adjoin an inlet port 39 of the vacuum proportional O/C valve 18 connected to the vacuum chamber 11.

As the valve element 34 is moved vertically along the center line of the valve seat 36, an annular clearance between the tapered surface 34a of the valve element 34 and the valve seat 36 of the valve body 45 will change in area. The vacuum proportion O/C valve 18 changes its opening degree to permit passage of gas. Even after a part of the poppet valve 33 comes into contact with the horizontal surface 36a of the valve seat 36, gas will leaks past the poppet valve 33 (i.e., the O-ring 35) until the O-ring 35 is pressed against the valve seat 36 at a pressure more than a predetermined value enough to completely close the vacuum proportional O/C valve 18. Then, with the O-ring 35 pressed through the poppet valve 33 at more than the predetermined pressure, the gas leakage is completely stopped.

Conventionally, the O-ring has been used only for the purpose of providing complete blockage of a gas flow passage of a valve body. It has been thus considered to be better that there was no leakage through the O-ring. However, the inventor of the present invention found that, by changing the pressure exerted on the O-ring 35 when in contact with the valve seat 36, the quantity of gas flow leaking through the O-ring 35 could further be regulated to a very small quantity. Specifically, the inventor has succeeded in inversely utilizing the leakage which there has conventionally been an effort to eliminate. The detail description will be mentioned later.

Figure 3:
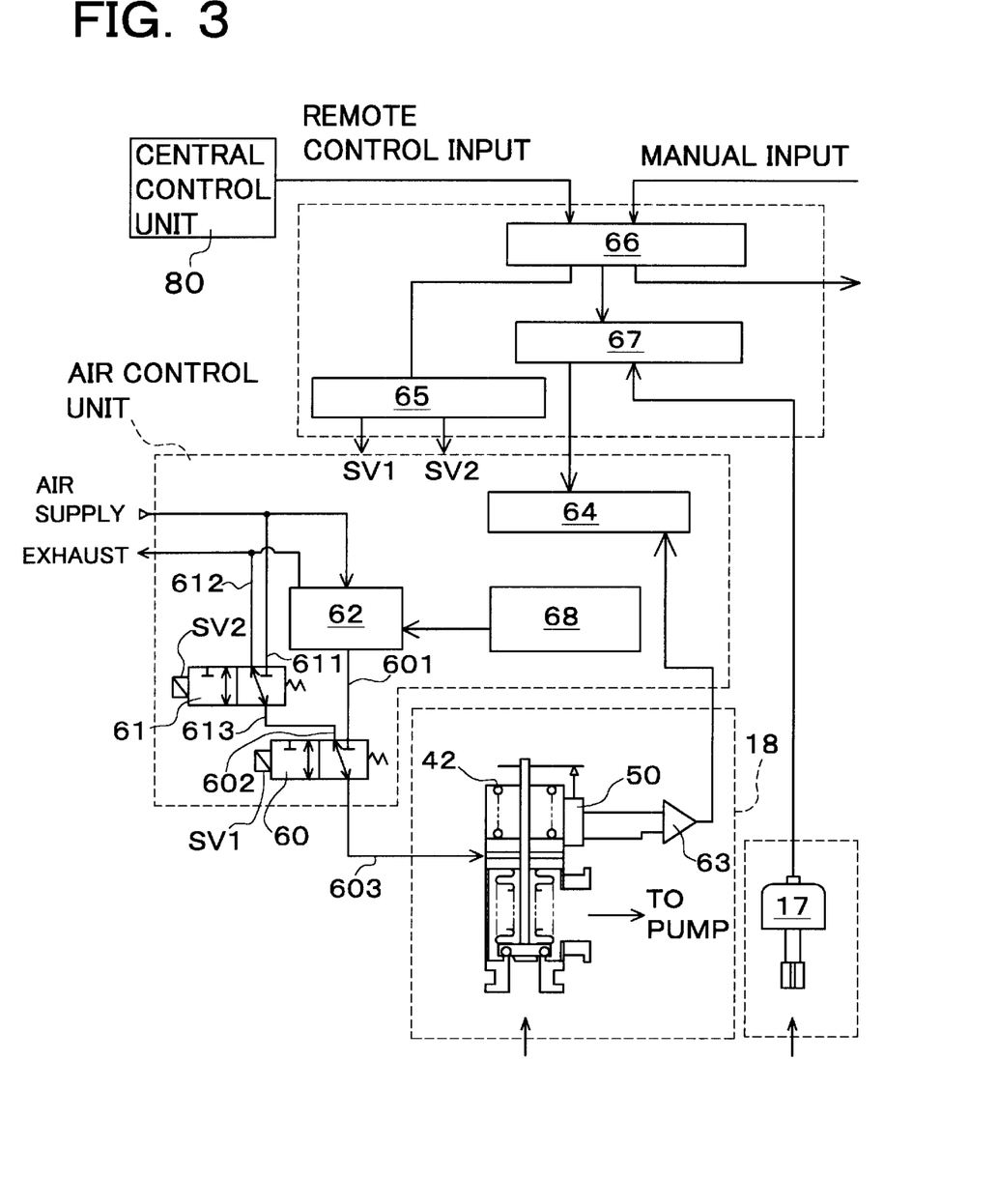
FIG. 3 is a block diagram schematically showing hardware of the vacuum pressure control apparatus in the embodiment.
Figure 4:
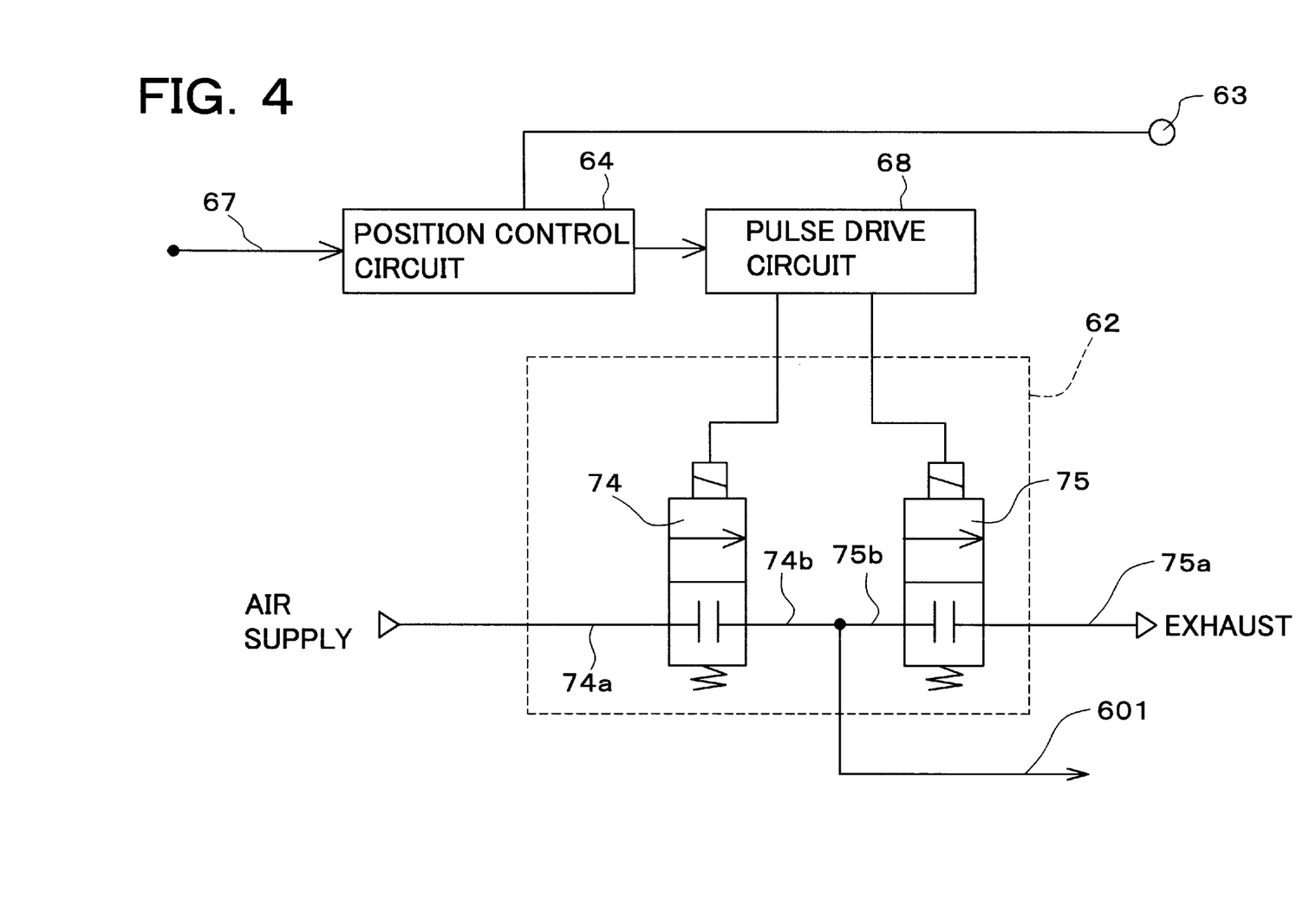
FIG. 4 is a block diagram schematically showing the structure of a timed opening and closing valve in the vacuum pressure control apparatus in the embodiment.

Description is made on the vacuum pressure control apparatus provided with the vacuum proportional O/C valve 18 configured as above in the present embodiment. FIG. 3 shows a whole system of the control apparatus. FIG. 4 schematically shows a structure of a timed on-off actuation valve 62 of the control apparatus.

Construction of an air control system in the apparatus is first described. The vacuum proportional O/C valve 18 is connected to an outlet port 603 of a first solenoid valve 60. The first solenoid valve 60 is connected to the timed on-off actuation valve 62 via a first inlet port 601 and to a second solenoid valve 61 via a second inlet port 602.

As shown in FIG. 4, the timed on-off actuation valve 62 is constructed of a proportional valve for air supply 74 and a proportional valve for exhaust 75. An inlet port 74a of the air supply proportional valve 74 is connected with an air supply source. An outlet port 75a of the exhaust proportional valve 75 is connected with an air exhaust pipe. An outlet port 74b of the proportional valve 74 and an inlet port 75b of the proportional valve 75 are both connected to the first inlet port 601 of the first solenoid valve 60.

An electrical system is next described. The timed on-off actuation valve 62 is connected to a pulse drive circuit 68. This pulse drive circuit 68 is connected to a position control circuit 64. The position control circuit 64 is also connected to the potentiometer 50 via an amplifier 63 and will receive signals representative of positions of the piston 41 from the potentiometer 50. The position control circuit 64 is also connected to a vacuum pressure control circuit 67.

The vacuum pressure control circuit 67 is also connected to an interface circuit 66 and the pressure sensor 17 respectively.

The interface circuit 66 is connected to a sequence control circuit 65 which is connected to a driving coil SV1 of the first solenoid valve 60 and a driving coil SV2 of the second solenoid valve 61.

Operation of the whole vacuum pressure control system constructed as above will be explained below.

Rapid gas supply and exhaust operation is first described.

To put the vacuum proportional O/C valve 18 in a full-open state, the first solenoid valve 60 is brought to its OFF position, and the second solenoid valve 61 is brought to its ON position.

Thus, the first inlet port 611 of the second solenoid valve 61 is connected to the outlet port 613, and the second inlet port 602 is connected to the outlet port 603, thereby to supply working air into the pilot cylinder 32 of the vacuum proportional O/C valve 18. With the working air, the piston 41 is moved upward within the single acting pneumatic cylinder 43 and the stainless valve element 34 of the poppet valve 33 is separated far from the valve seat 36. Accordingly, the vacuum pump 19 sucks a large quantity of gas from the vacuum chamber 11. Thus, rapid exhaust of gas is executed.

To put the vacuum proportional O/C valve 18 in a full closed state, the following manner is conducted.

The first solenoid valve 60 is brought to its OFF position and the second solenoid valve 61 is also brought to its OFF position. The second inlet port 612 of the second solenoid valve 61 is connected to the outlet port 613, and the second inlet port 602 of the first solenoid valve 60 is connected to the outlet port 603, establishing a connection between the vacuum proportional O/C valve 18 and the exhaust pipe line.

Then, no working air is supplied to the pilot cylinder 32 of the vacuum proportional O/C valve 18 and the air remaining therein is exhausted. This causes the piston 41 biased downward by the return spring 42 to move downward within the cylinder 43.

As shown in FIG. 1, a part of the poppet valve 33 is made into contact with the horizontal surface 36a of the valve seat 36. At this time, since the O-ring 35 is fully pressed by the poppet valve 33 against the horizontal surface 36a, and thus it is deformed so that the vacuum proportional O/C valve 18 is tightly closed and no gas leaks.

If a power failure occurs, on the other hand, the first and second solenoid valves 60 and 61 are similarly actuated such that the outlet port 603 and the second inlet port 602 of the first solenoid valve 60 are connected, and the outlet port 613 and the second inlet port 612 of the second solenoid valve 61 are connected. As mentioned above, the piston 41 is moved downward by a biasing force of the return spring 42, thus completely closing the vacuum proportional O/C valve 18. This realizes a rapid shut-off function in an emergency.

Next, operation of positional control of the poppet valve 33 to provide a predetermined pressure in the vacuum chamber 11 in a low, medium, and high vacuum regions will now be explained.

As mentioned above, the stainless valve element 34 having the tapered surface 34a, the sectional area of the clearance between the tapered surface 34a and the valve seat 36 (i.e., the distance between the surface 34a and the valve seat 36) will gradually vary according to stopping positions of the poppet valve 33. Accordingly, the opening of the proportional O/C valve 18 can be minutely changed to a certain extent when the stopping position of the poppet valve 33 is appropriately controlled.

In order to provide a medium vacuum region in the vacuum chamber 11, the poppet valve 33 is controlled to stop at a position where the tapered surface 34a is opposed to the valve seat 36, i.e., at least a part of the tapered surface 34a is inserted in the flow passage of the cylindrical surface 36b of the valve seat 36. In the medium region, a vacuum pressure is changed in response to the clearance area between the tapered surface 34a and the valve seat 36. To provide a high vacuum region, the poppet valve 33 is controlled to stop at a position where the tapered surface 34a is placed above and apart from the valve seat 36.

To provide a low vacuum region and a lower vacuum region near atmospheric pressure, an elastic deformation amount of the O-ring 35 is controlled in the following manner. This elastic deformation amount means the amount of change of a vertical diameter of O-ring 35 in a cross section (shown in FIGS. 1 and 2), the change being caused by a pressing force applied to the O-ring 35.

While the O-ring 35 is being pressed with the poppet valve 33 against the valve seat 36 so that the proportional o/c valve 18 is completely closed, the air pressure supplied to the pilot cylinder 32 is gradually decreased to reduce the pressure exerted on the valve member 33a, i.e., the O-ring 35, thereby changing the elastic deformation amount of the O-ring 35 so that a predetermined quantity of gas flow is permitted to leak between the O-ring 35 and the valve seat 36. Such the leakage of gas flow of a minute quantity can provide a desired low vacuum pressure. In the present embodiment, after the O-ring 35 is fully pressed until the proportional O/C valve 18 is completely closed as above, the pressure exerted on the O-ring 35 is controlled to decrease so that the deformation amount of the O-ring 35 is gradually reduced to permit a leakage flow of gas. Inversely, the deformation amount may be changed by the pressure exerted on the O-ring 35 which is controlled to gradually increase while the proportional O/C valve 18 shifts to the closed state from the open state.

In the present embodiment, the elastic deformation amount of the O-ring 35 is preferably changed in a range from 0 $\mu$m to 120 $\mu$m.

A sequence control circuit 65 receives a command signal representative of a desired vacuum pressure value in the vacuum chamber 11 from an externally provided central control unit 80 via an interface circuit 66, and then drives the driving coil SV1 to bring the first solenoid valve 60 to its open position and the coil SV2 to bring the second solenoid valve 61 to its closed position. Simultaneously the interface circuit 66 transmits a signal representing the desired vacuum pressure value to a vacuum pressure control circuit 67.

The vacuum pressure control circuit 67 makes comparison between the desired vacuum pressure value given from the interface circuit 66 and the current vacuum pressure value in the vacuum chamber 11 measured by the pressure sensor 17. She circuit 67 controls via a pulse drive circuit 6;the proportional valve 74 for air supply and the proportional valve 75 for exhaust of the timed on-off actuation valve 62 to change the opening of the proportional O/C valve 18 so that the current vacuum value conforms to the desired value.

Specifically, as mentioned later in detail, in the case that the current vacuum pressure value in the vacuum chamber 11 is nearer the atmospheric pressure than the command signal, the piston 41 is moved upward to increase the opening of the vacuum proportional O/C valve 18. To the contrary, in the case that the current vacuum pressure value is near the absolute vacuum pressure than the command signal, the piston 41 is moved downward to decrease the opening. Furthermore, to provide a lower vacuum pressure near the atmospheric pressure in the vacuum chamber 11, the timed on-off actuation valve 62 is actuated to press the O-ring 35 against the horizontal surface 36a of the valve seat 36 by the piston 41 through the valve member 33a such that the elastic deformation amount of the O-ring 35 reaches a predetermined value.

The pulse drive circuit 68 receives a signal from the vacuum pressure control circuit 67 and converts it into a pulse signal. This pulse signal is transmitted as an on-off signal to the supply and exhaust proportional valves 74 and 75 respectively, which are on-off actuated for a time duration according to the pulse signal to regulate the air pressure to be supplied to the vacuum proportional O/C valve 18.

Those valves 74 and 75 are solenoid valves having the function of separating the aforesaid valve member from the valve seat by a predetermined distance in accordance with pulse input voltages.

The pulse drive circuit 68 drives the air supply proportional valve 74 to supply the working air to the vacuum proportional O/C valve 18 and simultaneously drives the exhaust proportional valve 75 to exhaust the working air to be supplied to the valve 18 into the exhaust pipe, so that the supply pressure of working air can be finer regulated.

In the above manner, both the air supply proportional valve 74 connected with the air supply pipe and the exhaust proportional valve 75 connected with the air exhaust pipe are driven at the same time by pulse voltages given from the pulse drive circuit 68, thereby controlling the pressure of working air to be supplied to the vacuum proportional O/C valve 18. This makes it possible to exactly stop the piston 41 at a desired position at a high response speed.

Specifically, since the valves 74 and 75 are actuated in response to the electric pulse signals having the same constant cycle, the time ratio of on-time to off-time of each valve between the constant pulses is changed to regulate the quantity of flow of air allowed to pass through the valve 74 and the quantity of flow of air allowed to pass through the valve 75.

Each duty ratio of the air supply proportional valve 74 and the exhaust proportional valve 75 is determined in the position control circuit 64 as will be mentioned below.

To increase the opening of the vacuum proportional O/C valve 18 more than the command value, the duty ratio of the air supply proportional valve 74 is made larger. Consequently, the quantity of air to be supplied to the pilot cylinder 32 of the valve 18 increases and the air pressure in the inside thereof becomes higher accordingly. The valve member 33a is then moved in its more opening direction. This data is fed back via the potentiometer 50 to the position control circuit 64. The duty ratio of the air supply proportional valve 74 is made smaller as the measurement value in the potentiometer 50 comes close to the command value of opening, and then the duty ratio becomes a bias value when the measurement value exactly conforms to the command value.

To decrease the opening of the vacuum proportional O/C valve 18 more than the command value, the duty ratio of the air exhaust proportional valve 75 is made larger. Accordingly, the amount of air to be exhausted from the valve 18 increases and the air pressure in the pilot cylinder 32 of the valve 18 is accordingly decreased, causing the valve member 33a to move in a more closing direction. This result is fed back via the potentiometer 50 to the position control circuit 64. As the measurement value in the potentiometer 50 comes close to the opening command value, the duty ratio of the proportional valve 75 is made smaller, and then the duty ration becomes a bias value when the measurement value exactly conforms to the command value.

The bias is provided to remove a dead zone of actuation of the solenoid valve with respect to pulse signals. The dead zone is caused by the interaction between the load of the air pressure working on the solenoid valve and a return spring disposed in the solenoid valve.

For example, if the vacuum pressure in the vacuum chamber 11 is nearer the atmospheric pressure than the command signal representative of the desired pressure value, the poppet valve 33 is moved slightly upward to increase the valve opening. This causes an increase in the flow quantity of process gas sucked by the vacuum pump 19 so that the vacuum pressure value in the vacuum chamber 11 conforms to the desired vacuum pressure value provided by the command signal.

Specifically, the vacuum pressure control circuit 67 provides pulse voltages via the pulse drive circuit 68 to the proportional valve 74 to separate a valve member of the valve 74 from a valve seat of the same, thereby permitting a large quantity of working air to be supplied to the vacuum proportional O/C valve 18. This causes the piston 41 of the valve 18 to move upward and the poppet valve 33 to move upward in association of the movement of the piston 41. As a result, the clearance between the tapered surface 34a and the valve seat 36 increases in sectional area.

If only the proportional valve 74 is actuated, when there may be cases where the piston 41 goes past its desired position, it is difficult to stop the piston 41 exactly at the desired position. In the vacuum pressure control system of the present embodiment, however, the exhaust proportional valve 75 is simultaneously actuated, so that the pressure of the working air to be supplied to the vacuum proportional O/C valve 18 is reduced through the exhaust proportional valve 75 if the piston 41 goes past. Accordingly, the piston 41 can rapidly and accurately be stopped at the desired position.

Further, the vacuum pressure in the vacuum chamber 11 is nearer the absolute vacuum value than the command signal, for example, the poppet valve 33 is moved slightly downward to reduce the valve opening, so that a lesser quantity of process gas is sucked by the vacuum pump 19. The vacuum pressure value in the vacuum chamber 11 can therefore be regulated to conform to the vacuum pressure value provided by the command signal.

The vacuum pressure control circuit 67 provides pulse voltages via the pulse drive circuit 68 to the exhaust proportional valve 75 to separate a valve member of the valve 75 from a valve seat of the same, thereby stopping supply of the working air to the vacuum proportional O/C valve 18 and increasing the quantity of the air to be exhausted therefrom. This causes the piston 41 to move downward and the poppet valve 33 to move downward in association with the movement of the piston 41. As a result, the sectional area of the clearance between the tapered surface 34a and the valve seat 36 decreases.

If only the proportional valve 74 is actuated, when there may be cases where the piston 41 goes back past its desired position, it is difficult to stop the piston 41 exactly at the desired position. In the vacuum pressure control system of the present embodiment, however, the supply proportional valve 74 is simultaneously actuated, so that the pressure of the working air to be supplied to the vacuum proportional O/C valve 18 is increased through the valve 74 if the piston 41 goes past. As a result, the piston 41 can rapidly and accurately be stopped at the desired position.

Figure 6:
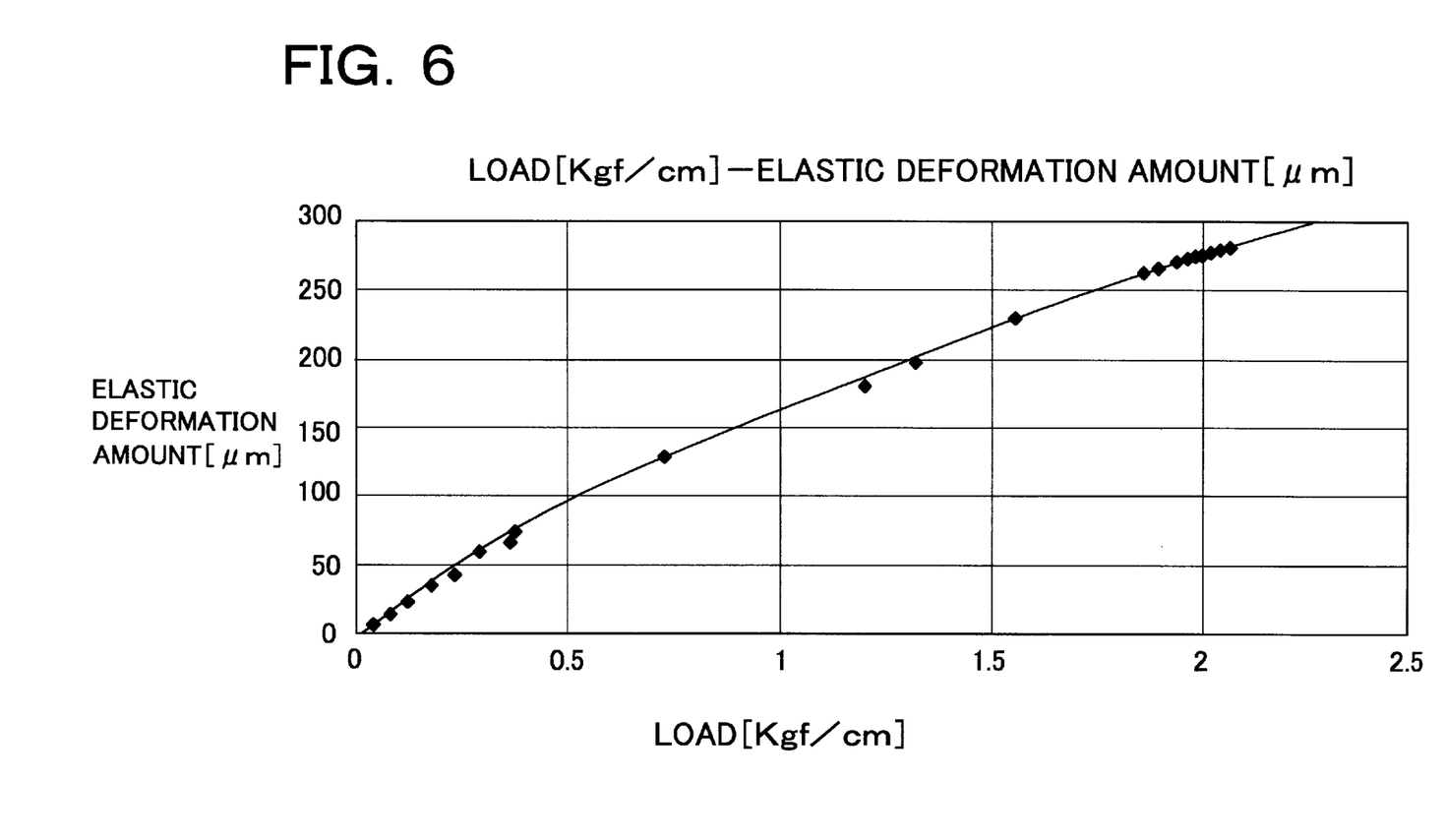
FIG. 6 is a graph of first data which represent effects obtained by using the vacuum pressure control apparatus in the embodiment.
Figure 7:
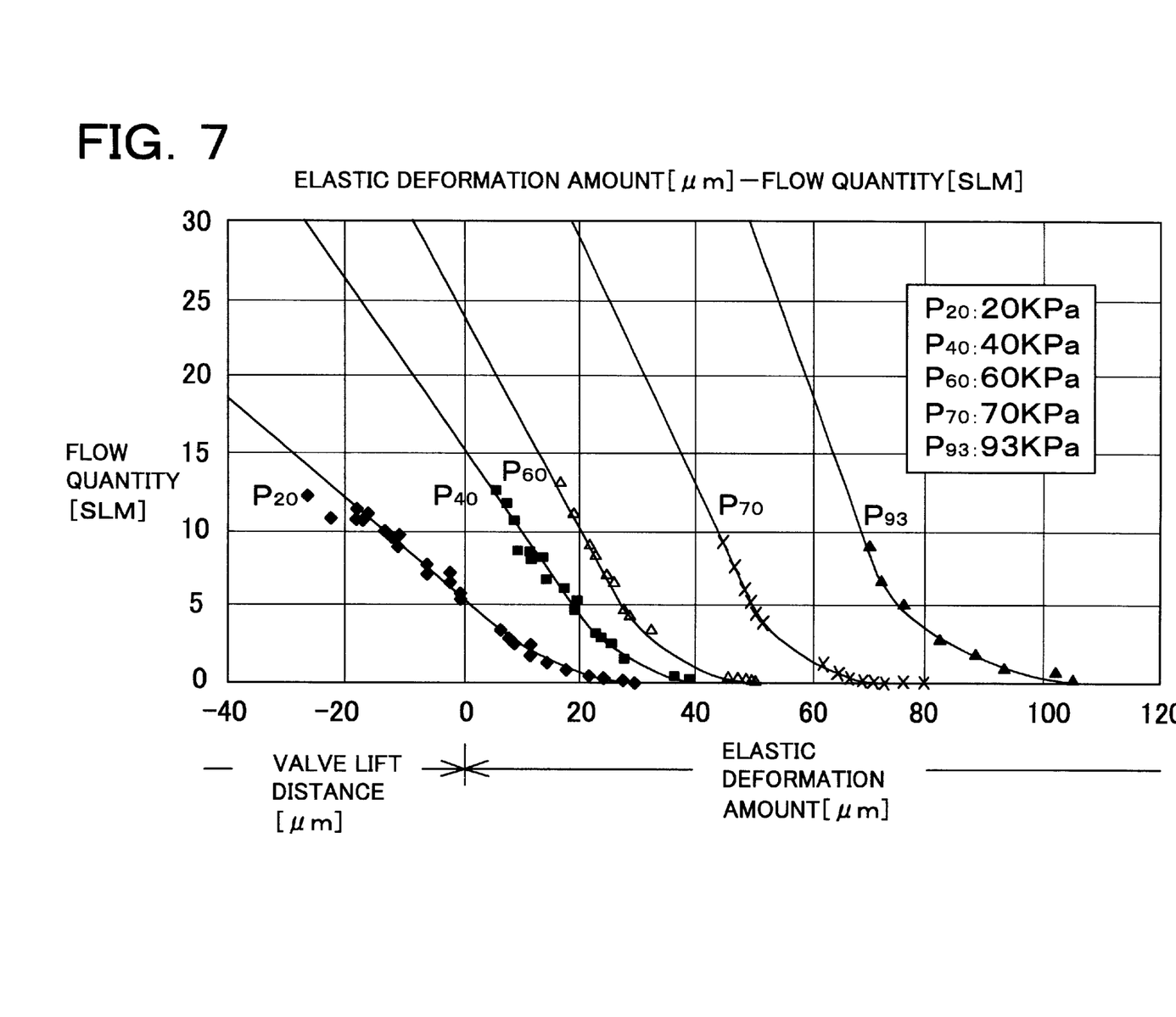
FIG. 7 is a graph of second data which represent effects obtained by using the vacuum pressure control apparatus in the embodiment.

In FIGS. 6 and 7, experimental data of effects obtained by means of the vacuum pressure control apparatus in the above embodiment are presented in graphical forms. The O-ring 35 used in the experiment is JIS (the Japanese Industrial Standards) P80 in size, fluorine rubber in material, 75HS (Shore "A" hardness) in rubber hardness, 79.6 mm in internal diameter, 91 mm in external diameter, 85.7 mm in central diameter, and 269.2 mm in perimeter.

In FIG. 6, the lateral axis of the graph indicates the load applied to the O-ring 35 per 1 cm in a unit of Kgf/cm and the vertical axis indicates an elastic deformation amount of the O-ring 35 in a unit of $\mu$m. This elastic deformation amount means the amount of change of a vertical diameter of O-ring 35 in a cross section (shown in FIGS. 1 and 2), the change being caused by a load (a pressing force) applied to the O-ring 35. The load is calculated by dividing the force exerted on the O-ring 35 by the perimeter of the O-ring 35.

As shown in FIG. 6, a linear relationship is established between the load exerted on the O-ring 35 and the elastic deformation amount. Controlling the load to be applied to the O-ring 35, therefore, a desired elastic deformation amount can be provided.

In FIG. 7, the lateral axis of the graph indicates the elastic deformation amount of the O-ring 35 in a unit Aim and the vertical axis indicates the quantity of gas flow allowed to pass through the vacuum proportional O/C valve 18 in a unit of SLM (Standard Liter/Min.).

The data shown in FIG. 7 are experimental values obtained using the vacuum proportional O/C valve 18 having a specified volume. Those experimental values are the quantities of the gas permitted to pass through the valve 18 measured during control of the pressure in the vacuum chamber 11 in the lower vacuum pressure P near the atmospheric pressure. Lines in the graph indicate the data in $P_{20}$=20KPa (150 Torr), $P_{40}$=40KPa (300 Torr), $P_{60}$=60KPa (450 Torr), $P_{70}$=70KPa (530 Torr), and $P_{93}$=93KPa (700 Torr), respectively.

As shown in FIG. 7, it is found that an almost linear relationship is established between the elastic deformation amount of the O-ring 35 and the quantity of gas flow in a region where the flow quantity is 1 SLM or more.

In order to provide a lower vacuum region near atmospheric pressure in the vacuum chamber 11, usually, the vacuum proportional O/C valve 18 is operated so as to permit flow of gas in the quantity range of 1 to about 10 SLM, in which the air pressure supplied to the pilot cylinder 32 is in a linear relation to the quantity of flow of gas. Due to such the relation, when the air pressure to be supplied to the pilot cylinder 32 is appropriately controlled, the quantity of gas flow permitted to pass through the proportional O/C valve 18 can be accurately regulated. This makes it possible to provide a lower vacuum pressure region near the atmospheric pressure in the vacuum chamber 11.

In the above embodiment, the current pressure in the vacuum chamber 11 is feedback-controlled by measurement values sensed by the pressure sensor 17. Specifically, based on the desired vacuum pressure and the measured vacuum pressure, the quantity of gas flow needed to provide the desired vacuum pressure is determined from FIG. 7. Sequentially, the air pressure to be applied to the pilot cylinder is changed so that the elastic deformation amount reaches a value corresponding to the desired vacuum pressure. Thus, high control with an optimum responsibility can be conducted according to the vacuum pressure.

If the relationship between the elastic deformation amount and the quantity of gas flow are stored as data in a map or the like, furthermore, the quantity of gas flow can be also regulated to a region of 1 SLM or less when the deformation amount of the O-ring 35 is changed to a predetermined value. It is conceivable that the deformation amount of the O-ring 35 varies with time. However, any problems resulting from the time-varying will not occur owing to the feedback control in the present embodiment.

As seen in FIG. 7, the quantity of the gas flow permitted to pass through the vacuum proportional O/C valve 18 is in a one-to-one relationship with the deformation amount of the O-ring 35. Instead of control of the deformation amount of the O-ring 35 by using air pressure to be applied to the pilot cylinder as in the present embodiment, the deformation amount of the O-ring 35 may be controlled with the use of a linear feeding device utilizing a servo-motor and the like. This can provide the same effect as in the above embodiment.

As is evident from FIG. 7, the elastic deformation amount of the O-ring 35 needs to be regulated in a range from 0 $\mu$m or more to 120 $\mu$m or less. If another O-ring having a larger diameter than that of the O-ring 35 in the present embodiment, the deformation amount thereof may be regulated in a range of 120 $\mu$m or more.

As described above in detail, the vacuum pressure control apparatus in the above embodiment is provided with the vacuum proportional O/C valve 18 which is disposed on a pipe connecting the vacuum chamber 11 to the vacuum pump 19 and changes its opening to control the vacuum pressure in the vacuum chamber 11 and the pressure sensor 17 which measures the current vacuum pressure in the vacuum chamber 11. The valve 18 includes the valve seat 36 having the cylindrical inner surface 36b and the horizontal surface 36a, and the valve member 33a provided with the O-ring 35 which is made contact with or separate from the horizontal surface 36a. In the vacuum pressure control apparatus configured as above, the air pressure to be supplied to the pilot cylinder 32 of the valve 18 is regulated based on the outputs of the pressure sensor 17 to change the elastic deformation amount of the O-ring 35. Thus, the quantity of the gas flow permitted to leak between the horizontal surface 36a and the O-ring 35 is regulated to provide a desired vacuum pressure in the vacuum chamber 11. In this manner, the pressure in the vacuum chamber 11 can be accurately regulated to a lower vacuum region near atmospheric pressure.

In the above embodiment, utilizing the linear relationship established between the pressing force applied to the O-ring 35 and the elastic deformation amount of the O-ring 35, the control thereof is simple and a low-priced control apparatus can be achieved. In addition, the O-ring 35 used as an elastic sealing member has an advantage in ensuring stable quality.

It is to be noted that although the O-ring 35 is used as an elastic sealing member in the above embodiment, other elements such as a rubber member having a triangle cross section may be used. In case of the rubber member, it is mounted on the underside of the horizontal portion of the valve member 33a by adhering, baking, or the like.

Furthermore, the vacuum proportional O/C valve 18 has the pilot cylinder for moving the valve member 33a, the vacuum pressure control apparatus operates to regulate the air pressure to be supplied to the pilot cylinder to change the pressing force exerted on the valve member 33a, thereby controlling the elastic deformation amount of the O-ring 35 pressed by the valve member 33a against the valve seat 36. Accordingly, the conventional vacuum pressure control system can be used in the as-is status thereof, thus enabling a reduction in cost.

When the deformation amount of the O-ring 35 is regulated to a predetermined value or more, the vacuum proportional O/C valve 18 can also be completely closed without gas leak.

The pilot cylinder 32 is configured such that the bellofram 51 is attached to the piston 41 to separate both sides of the piston 41 in its axial direction in order to seal the cylinder 43 hermetically. Accordingly, during vertical movement of the piston 41, sliding resistance of the piston 41 with respect to the cylinder 43 is very small. The stopping position of the piston 41 can be finely controlled.

The pilot cylinder 32 in the above embodiment is a cylinder of a normal closed type, which will fully be closed rapidly and urgently when any trouble such as a power failure occurs.

The present invention may be embodied in other specific forms without departing from the spirit or essential characteristics thereof. For instance, instead of the control of the load applied to the O-ring, a linear feeding device using a stepping motor, a servo-motor, or the like may be used for elastically deforming the O-ring by a predetermined amount.

As the elastic sealing member, besides a member having a circular section such as an O-ring, a rubber member having a triangular section may be used. Such the rubber member is attached to the valve member 33a with adhesion or the like.

According to the present invention, the elastic deformation amount of the elastic sealing member is regulated in order to change the quantity of the gas flow permitted to leak between the elastic sealing member and the valve seat being in contact with the sealing member, thereby controlling the pressure in the vacuum vessel. The pressure in the vacuum vessel can be accurately regulated to a predetermined value in a lower vacuum region near atmospheric pressure.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vacuum pressure control apparatus for controlling vacuum pressure in a vacuum vessel from which gas is sucked by means of a vacuum pump, the apparatus including:

a vacuum proportional opening and closing valve which is disposed between the vacuum pump and the vacuum vessel and changes its opening for controlling the vacuum pressure in the vacuum vessel, the vacuum proportional opening and closing valve including a valve seat having a continuous peripheral seating surface and a central flow passage through which the gas is sucked from the vacuum vessel to the vacuum pump, and a valve member that is movable to come into contact with the seating surface of the valve seat and to separate from the same, the valve member being provided with an elastic sealing member on a surface that comes into contact with the valve seat after progressive elastic deformation of the elastic sealing member from a minimum value at which gas leakage occurs between the elastic sealing member and the seating surface of the valve seat, through intermediate values at which the gas leakage is progressively reduced, to a maximum value at which no gas leakage occurs between the seating surface of the valve seat, a pressure sensor for measuring the pressure in the vaccum vessel, and a vacuum pressure control system for controlling a change in an elastic deformation amount of the elastic sealing member in contact with the valve seat to regulate the quantity of gas leakage between the elastic sealing member and the valve seat, the control system having previously stored, with respect to plural levels of vacuum pressure in the vacuum vessel, data representing the relation between the quantity of gas leakage and the deformation amount of the elastic sealing member at each level of the vacuum pressure, selecting a pressure level corresponding to a measured value detected by the pressure sensor from among the plural levels, and controlling the deformation amount of the elastic sealing member based on the relation between the leakage amount and the deformation amount at the selected vacuum pressure level.

2. The vacuum pressure control apparatus according to claim 1, wherein the elastic deformation amount of the elastic sealing member is controlled to change in a range from 0 μm or more and 120 μm or less.

3. The vacuum pressure control apparatus according to claim 1, wherein a force applied to the elastic sealing member which is in contact with the valve seat through the valve member is controlled to change the elastic deformation amount of the elastic sealing member.

4. The vacuum pressure control apparatus according to claim 3, wherein the vacuum proportional opening and closing valve includes a pilot cylinder for moving the valve member, the vacuum pressure control apparatus controlling a change in air pressure to be supplied to the pilot cylinder to thereby control the force applied to the elastic sealing member which is in contact with the valve seat through the valve member and change the elastic deformation amount of the elastic sealing member.

5. The vacuum pressure control apparatus according to claim 4, further including:

a pulse-type air supply proportional valve and a pulse-type air exhaust proportional valve for changing the air pressure to be supplied to the pilot cylinder, and the air supply proportional valve and the air exhaust proportional valve are controlled to be actuated at the same time.

6. The vacuum pressure control apparatus according to claim 1, wherein the elastic sealing member is an O-ring.

7. The vacuum pressure control apparatus according to claim 1, wherein when the vacuum proportional opening and closing valve is intended to completely close with no gas leak, the elastic sealing member is pressed against the valve seat so that the elastic deformation amount of the elastic sealing member which is in contact with the valve seat reaches a predetermined value or more.

* * * * *